US007999842B1

(12) United States Patent
Barrus et al.

(10) Patent No.: US 7,999,842 B1
(45) Date of Patent: Aug. 16, 2011

(54) CONTINUOUSLY ROTATING VIDEO CAMERA, METHOD AND USER INTERFACE FOR USING THE SAME

(75) Inventors: John Barrus, Menlo Park, CA (US); Jonathan J. Hull, San Carlos, CA (US)

(73) Assignee: Ricoh Co., Ltd., Tokyo (JP)

( * ) Notice: Subject to any disclaimer, the term of this patent is extended or adjusted under 35 U.S.C. 154(b) by 1024 days.

(21) Appl. No.: 10/856,292

(22) Filed: May 28, 2004

(51) Int. Cl.
*H04N 7/00* (2011.01)
(52) U.S. Cl. .......................................................... 348/37
(58) Field of Classification Search ...................... 348/36
See application file for complete search history.

(56) References Cited

U.S. PATENT DOCUMENTS

| | | | | |
|---|---|---|---|---|
| 6,134,223 A * | 10/2000 | Burke et al. | ................... | 370/265 |
| 6,587,597 B1 * | 7/2003 | Nakao et al. | ................... | 382/284 |
| 6,639,596 B1 * | 10/2003 | Shum et al. | ................... | 345/427 |
| 6,720,987 B2 * | 4/2004 | Koyanagi et al. | ................ | 348/36 |
| 7,176,960 B1 * | 2/2007 | Nayar et al. | ............. | 348/207.99 |
| 2002/0131643 A1 * | 9/2002 | Fels et al. | ....................... | 382/224 |
| 2004/0207726 A1 * | 10/2004 | McCutchen | .................... | 348/46 |
| 2005/0157166 A9 * | 7/2005 | Peleg et al. | ..................... | 348/53 |

* cited by examiner

*Primary Examiner* — Jayanti K Patel
*Assistant Examiner* — Richard Torrente
(74) *Attorney, Agent, or Firm* — Blakely, Sokoloff, Taylor & Zafman LLP

(57) ABSTRACT

A continuously rotating camera and method for using the same are described. In one embodiment, the method comprises repeatedly rotating a camera, including rotating an image capture sensor. The method further comprises converting the data captured by the image capture sensor into a data stream and creating panorama images for multiple camera rotations from captured video frames for each rotation.

70 Claims, 10 Drawing Sheets

In the original configuration, during frame G, the camera captures segments 7, 8, and 9 because they are side by side With the two mirrors, frame G contains an image straight ahead (8) as well as behind (+120 degrees and -120 degrees, segments 28 and 18).

Note that the images in 28 and 18 are reversed in G because they are captured through mirrors.

Panorama

In the original configuration, during frame G, the camera captures segments 7, 8, and 9 because they are side by side With the two mirrors, frame G contains an image straight ahead (8) as well as behind (+120 degrees and -120 degrees, segments 28 and 18).

Note that the images in 28 and 18 are reversed in G because they are captured through mirrors.

Using the mirrors, as the camera rotates, it captures images from 3 different directions. Segment 8, instead of getting captured 3 times in immediate succession, is captured every 1/3rd of a second. With processing, the frame rate of the video now appears to be 3 times per second instead of 1 time per second.

Video Frames

US 7,999,842 B1

CONTINUOUSLY ROTATING VIDEO CAMERA, METHOD AND USER INTERFACE FOR USING THE SAME

FIELD OF THE INVENTION

The present invention relates to the field of video capture and viewing of video; more particularly, the present invention relates to continuously rotating a video camera to repeatedly capture video frames to create a single panorama that is continuously updated.

BACKGROUND OF THE INVENTION

High-resolution, still panoramic images are typically captured using a digital camera on a rotating platform, tripod, turntable, and spindle. The camera is rotated once, and images taken while the camera is rotated are combined to fill a panoramic mosaic. When automated, this process can be completed in a few minutes.

A still imaging camera mounted on top of a robot has been used to take panoramic images. The robot is designed to travel around a city taking panoramic images of various local scenes.

However, all of these devices are designed for still imaging cameras, and these cameras do not perform continuous video capture, store the video data on the device, and process it in real-time. Furthermore, although panoramic images may be generated, only the entire panoramic image is output.

Moving panoramic video images are usually captured using a non-moving panoramic video camera optically coupled to curved mirrors or fish-eye lenses that capture the entire 360-degree view at once. For example, a fish-eye lens camera uses a spherical mirror to capture a hemisphere and then morphs the captured hemisphere into video. The resulting video undergoes extensive image processing to create low-resolution videos of the panoramic scene. With such a system, the frame rate is maintained across the entire scene at the expense of the resolution of the resulting video frames.

One solution for both 360-degree video imaging and selective view generation is to use a panoramic lens affixed to a video camera. An example of such a solution is the Netvision360 product from Remote Reality.

In another prior art solution, a large set of cameras is used (e.g., 20 cameras) for stereo video. Each of the cameras produces a video stream. For example, Ladybug uses 5 cameras to capture 360 degrees. In one example, 60 cameras are used to capture a 3D image.

In another example, video is captured by pointing multiple cameras at a mirror. By processing all of the video streams, portions of the various video streams may be combined to create a full three-dimensional image of a scene. In another prior art solution, video is captured using cameras that point to a set of mirrors. The result is a 360 degree field of view. Thus, it is possible to obtain a high resolution video stream, but only with multiple cameras.

SUMMARY OF THE INVENTION

A continuously rotating video camera and method for using the same are described. In one embodiment, the method comprises repeatedly rotating a video camera, including rotating an image capture sensor. The method further comprises converting the data captured by the image capture sensor into a data stream and creating panorama images for multiple camera rotations from captured frames.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1:
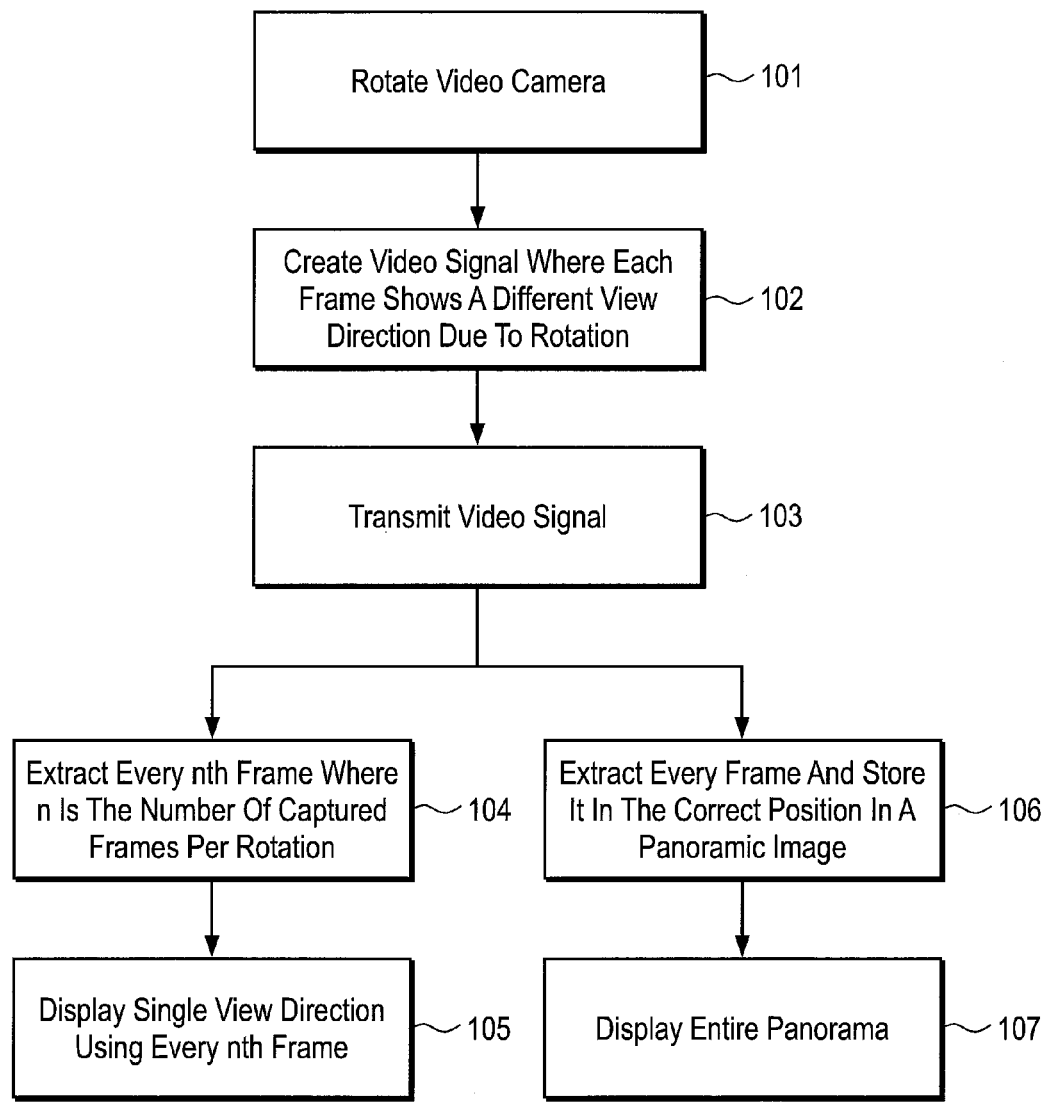
FIG. 1 is a flow diagram of one embodiment of a process for capturing a video stream from a rotating camera and displaying the captured video.

A repeatedly rotating camera is described. In one embodiment, the rotating camera captures video frames for each rotation and combines the video frames into a single video stream. The video stream is transmitted. Alternatively, the video frames can be combined into a single panoramic image and a portion of that image can be designated as the portion of interest. That portion is then displayed to the user using the captured frames from the rotating camera.

In one embodiment, the camera is repeatedly rotated and captures a high-resolution video of an entire panorama. That is, the spinning camera captures a 360-degree panoramic video. In one embodiment, as the camera rotates, images are captured every $1/30^{th}$ of a second. Since the camera is rotating, each image is captured with the camera pointing in a different direction. The rotation of the camera is synchronized with the camera's shutter so that the camera takes a picture of the same view every N frames. For instance, if the rotation of the video camera is twice per second, every $15^{th}$ frame after the first north-pointing frame points precisely north, the $7^{th}$ frame after the north frame points nearly south, and every $15^{th}$ frame after the first south-pointing frame also points south. The individual frames could be stitched together to create a larger panoramic video.

In one embodiment, all of the frames from a single direction are viewed to create the illusion of a low frame-rate non-rotating video camera. For instance, north-facing frames will only occur every $15^{th}$ frame or twice per second. Viewing only those frames gives the illusion of a north-facing camera with a frame rate of 2 frames per second.

One advantage of at least one embodiment described herein is that the entire 360-degree view can be stored in a single video stream for recording or transmission to a remote viewing site. In one embodiment, individuals remotely watching a video stream from the rotating camera can individually select a part of the single video stream to view in order to control the part of the scene they are observing. An additional advantage of at least one embodiment of the present invention is that this video stream can be obtained with a single video analog-to-digital converter.

One unique aspect of one embodiment of the present invention is the trade off between resolution and frame rate of the resulting panoramic video when using the rotating camera. Additionally, image processing requirements are significantly lower than the image de-warping required for fish-eye mirror or lens systems.

In one embodiment, a surveillance system uses a video cassette recorder (VCR) to record the video stream from such a camera. In that case, the recorded video stream could be used to examine multiple camera directions, including those not observed by the security personnel at the time of recording.

In the following description, numerous details are set forth. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Overview

FIG. 1 is a flow diagram of one embodiment of a process for capturing a panorama and displaying a video stream, or a portion thereof. The process is performed by mechanical hardware, processing logic that may comprise hardware (e.g., circuitry, dedicated logic, etc.), software (such as is run on a general purpose computer system or dedicated machine), or a combination.

Generally, in a system such as shown in FIG. 1, there are many pieces of software and hardware that work together. For instance, the motor rotating the video camera at (processing block 101) is controlled by a motor control circuit that may be analog or digital and may or may not be coupled to other control circuits in the system. Additionally, the image capture device typically contains circuitry to convert captured images into video streams. This combination of hardware and software may or may not be coupled to other circuits in the system. Finally, there is a combination of hardware and software that receives and interprets the video stream coming from the image capture device. Typically this is not connected directly to the image capture circuitry except through the video stream transmission that may be through one or more cables or through a wireless transmission mechanism. It should be understood that the terms processing logic may refer to any or all of the circuits specified herein.

Referring to FIG. 1, the process begins by processing logic causing a motor to rotate a video camera (processing block 101). While the video camera rotates, processing logic creates video signals where each frame shows a different view direction due to rotation (processing block 102). In one embodiment, the video camera system includes a rotating image capture sensor that captures data into a data stream and a circuit board or other circuitry mechanism (e.g., discrete circuit, logic, integrated circuit chip) that converts captured data from the rotating image capture sensor into a standard video signal.

In one embodiment, the video signal comprises an industry standard digital video signal (e.g., ITU-R BT 601 for uncompressed, H.323, etc for compressed). In an alternative embodiment, the video signal comprises an industry standard analog video signal (e.g., NTSC, PAL, SECAM). In yet another alternative embodiment, video signal comprises a signal that adheres to an Internet streaming protocol.

Processing logic transmits the video signal to another location and/or device (processing block 103). The transmission of the video signal may via a wired or wireless communications mechanism in a manner well known in the art.

After transmitting the video signal, processing logic optionally extracts every nth frame, where n is the number of captured frames per rotation (processing block 104) and displays a single view direction using every nth frame (processing block 105). Also, processing logic optionally extracts every frame and stores them in the correct position in a panoramic image (processing block 106) and displays the entire panorama (processing block 107).

Figure 2:
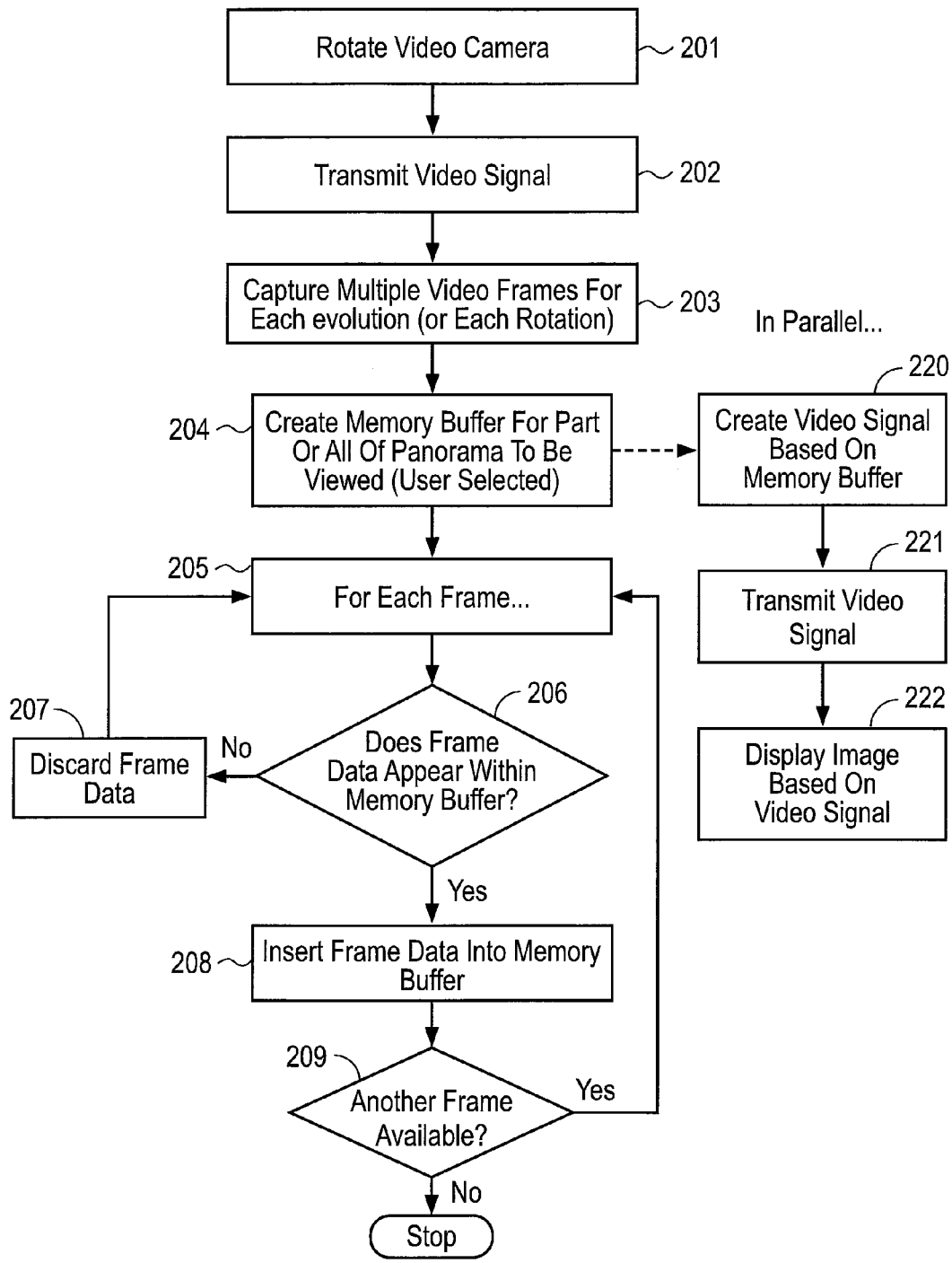
FIG. 2 is a flow diagram of one embodiment of a process for viewing a portion of a video stream.

FIG. 2 is a flow diagram of an alternative embodiment of a process for capturing a panorama and displaying a video stream, or a portion thereof. The process is performed by processing logic that may comprise hardware (e.g., circuitry, dedicated logic, etc.), software (such as is run on a general purpose computer system or dedicated machine), or a combination of both.

Referring to FIG. 2, the process begins by causing a motor or other rotation mechanism to rotate the video camera (processing block 201) and transmitting the video signal (processing block 202).

After transmitting the video signal, processing logic captures multiple video frames for each revolution of the rotating video camera (or each rotation of the video camera) (processing block 203). Thus, while repeatedly rotating the video camera, processing logic captures multiple video frames for each rotation.

Figure 6:
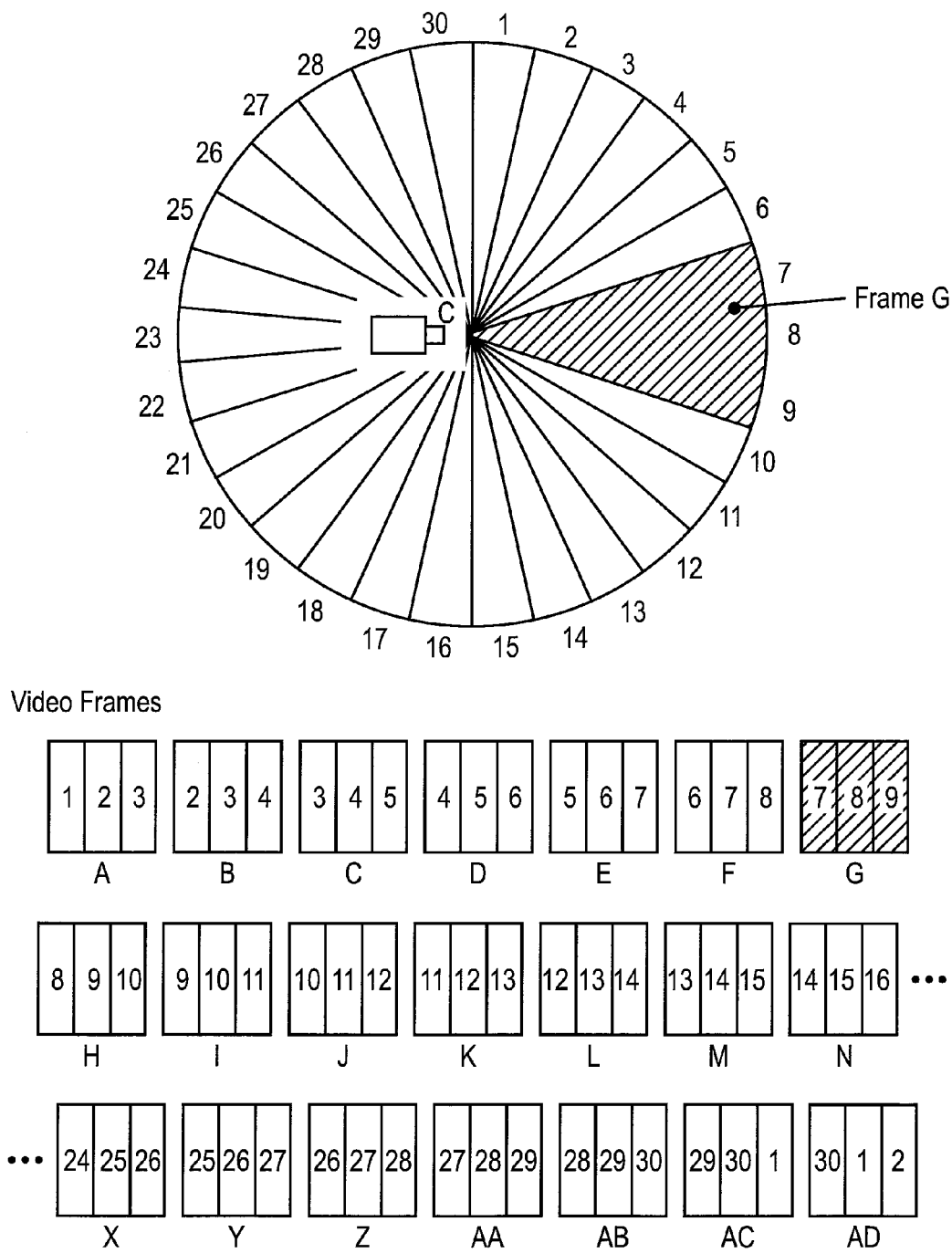
FIG. 6 illustrates the locations of video frames captured by a rotating video camera.

In one embodiment, the video camera captures 30 video frames per second. In such a case, if the video camera is turning 360 degrees every second, the video camera direction changes by 12 degrees every time a new frame is captured. In a typical configuration and one embodiment, a video camera can capture about 40 degrees of a circle with each frame. Since the camera rotates only 12 degrees between frames, the camera takes pictures of each 12-degree segment 3 times in a row. For convenience, each of the thirty 12 degree segments in the circle is numbered from 1 to 30 in a clockwise direction with the camera rotating in the same direction as shown in FIG. 6. If the camera starts capturing frames when it is centered at segment 2, it will also capture segment 1 and segment 3 on either side of segment 2. After $1;30^{th}$ of a second, the camera has rotated 12 degrees, is now centered on segment 3 and will also capture segments 2 and 4. The following frame includes segments 3, 4 and 5, and then the frame after that includes 4, 5, and 6 and so on.

Consider the single 12-degree segment numbered segment 8. Segment 8 is captured on the right hand side of the frame beginning with the $6^{th}$ frame which is referred to as frame F. Segment 8 is again captured with the next two frames $1/30^{th}$ and $2/30^{ths}$ of a second later—once in the middle of the frame and finally on the left side of the frame. In other words, every second of rotation, segment 8 is captured 3 times—frames F, G, and H. In the embodiment previously described, processing logic captures only one of those frames every second and so only uses one of the segment 8 images each second making a 1 frame per second video. Even if processing logic extracted the other segment 8 images from the other frames and displayed those frames, two of those images would only be displayed for $1/30^{th}$ of a second and the final image would persist for the rest of the second.

Figure 7:
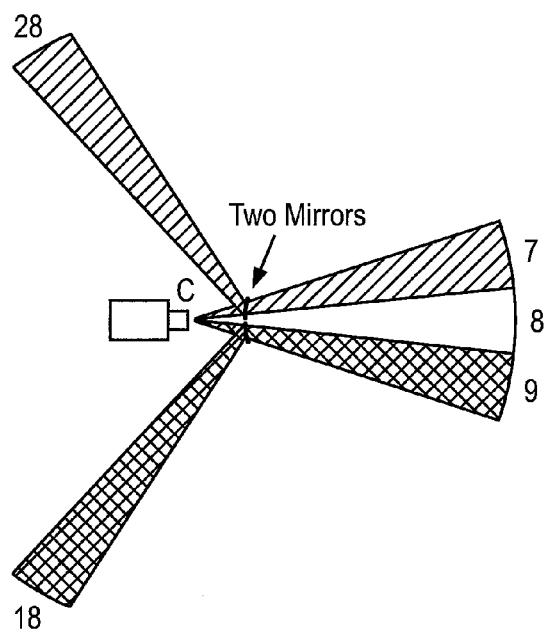
FIG. 7 illustrates the use of mirrors in conjunction with a video camera to capture video frames, along with a resulting panorama.
Figure 7:
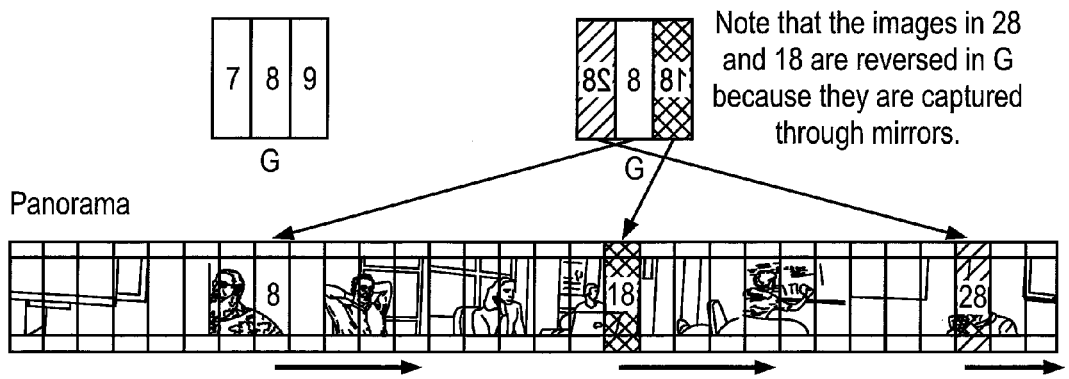

It is possible to use mirrors to capture images from 3 different directions in a way that evenly spaces the segments captured so that the resulting video will effectively be 3 frames per second instead of 1 frame per second. In one embodiment, as shown in FIG. 7, a pair of mirrors may be positioned in front of the camera such that the camera captures an image of the segment straight in front of the camera as well as two other segments 120 degrees and 240 degrees away from the camera's lens on the circular 360 degree field of view. For instance, instead of capture segments 7, 8 and 9 in frame G, the camera captures segments 28, 8, and 18. Using the configuration shown in FIG. 7, the images in segments 28 and 18 are reversed and processing logic would have to reverse the images before they were usable. However, reversing video data is well understood in the art and easily accomplished as needed.

Figure 8:
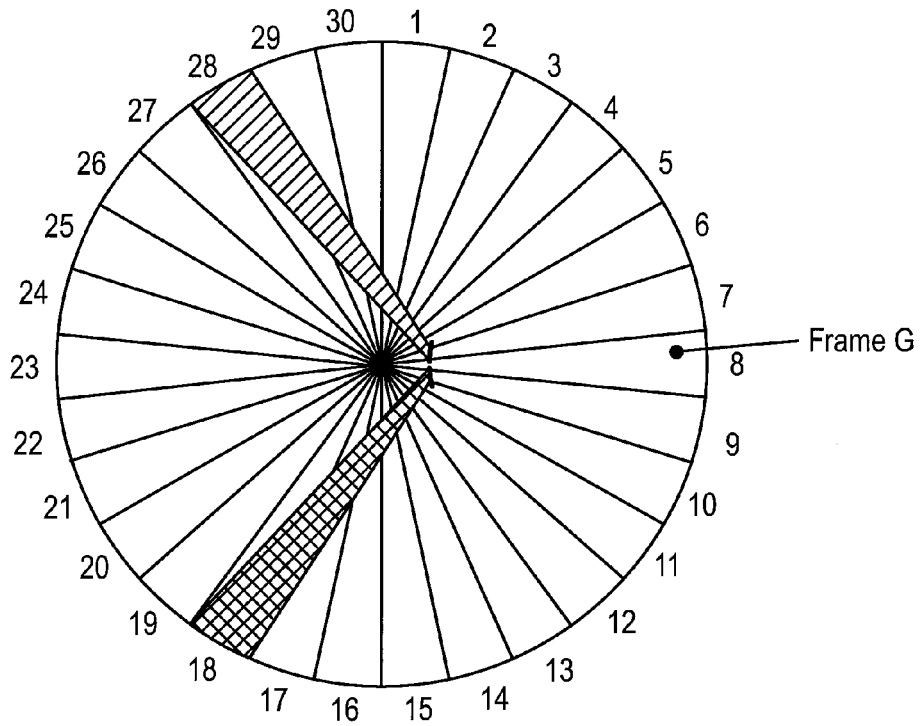
FIG. 8 illustrates locations of video frames captured by a rotating video camera when using mirrors.
Figure 8:
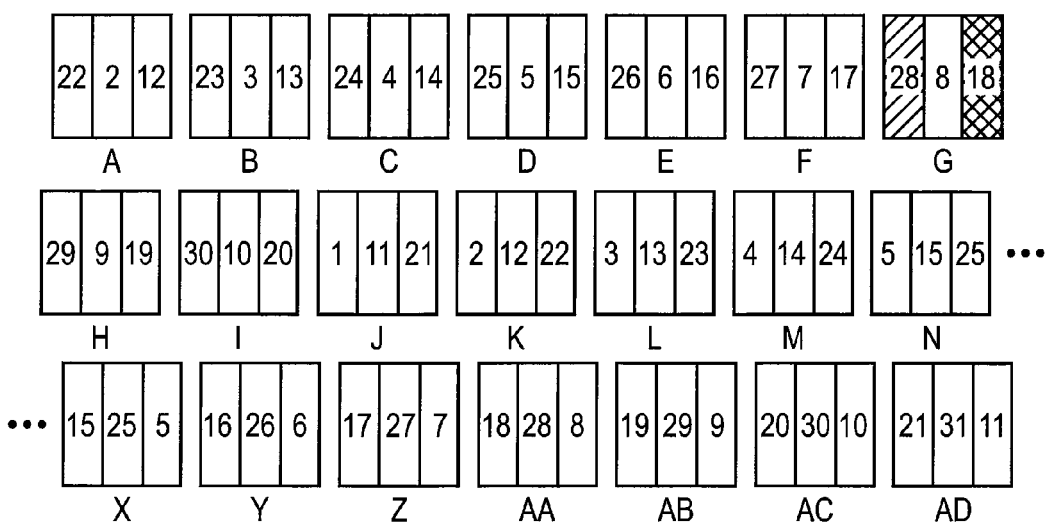

In the mirror-based system, the video camera still captures 30 frames per second and each segment is captured 3 times every second. However, using the mirrors, the segments captured simultaneously are no longer the neighboring segments as shown in FIG. 8.

To process such video, processing logic creates a memory buffer of either the entire panorama or some part of it. When each frame is received by processing logic from the image capture device, it is digitized and then each segment is drawn in its proper position in the buffer. If the buffer includes the entire panorama, then with each captured frame, the 3 segments are separated, 2 images of the right and left segments are reversed and all 3 are placed in the memory buffer in the correct position. If the entire memory buffer was displayed each time it was updated, the viewer would see the entire panorama with 3 separate updates sweeping across the display simultaneously as shown in FIG. 7. In FIG. 8, frame G is being used to update segments 8, 18, and 28 and then frame H will be used on 9, 19, and 29, etc.

If only a part of the panorama is stored in memory or displayed, some segments and perhaps some entire frames can be ignored. For instance, if someone is only viewing segments 7, 8 and 9, processing logic is only required to process frames containing those segments and other frames or segments can be discarded. For only segments 7, 8 and 9, at least some segments of 9 frames per second is digitized (F, G, H, P, Q, R, Z, AA, AB) while 21 frames can be ignored completely (A, B, C, D, E, I, J, K, L, M, N, O, S, T, U, V, W, X, Y, AC and AD). Note that every $1/10^{th}$ of a second, all three segments are updated with new images. The apparent 3 frames per second is an improvement over the apparent 1 frame per second achieved without the mirrors. Of course, if someone wants to view segments 10-20, more segments will have to be digitized and no frames can be entirely ignored since each frame has at least one of segments 10-20 included.

Note that in one embodiment, only one mirror is used so that images are captured in two different directions at the same time so that the resulting video will effectively be 2 frames per second. Alternatively, more than 2 mirrors may be used.

Processing logic processes each frame to store the data into the memory buffers. In order to perform this processing, processing logic first tests whether the frame data appears within the memory buffer (processing block 206). If the frame data does not appear within the memory buffer, processing logic discards the frame data (processing block 207) and the process transitions to processing block 205 to process the next frame. If the frame data does appear within the memory buffer, processing logic inserts the frame data into the memory buffer (processing block 208) and then tests whether another frame is available (processing block 209). If another frame is available, the process transitions to processing block 205 to process the next frame. If another frame is not available, the process ends.

In one embodiment, as part of processing and storing the data into the memory buffers, processing logic combines the video frames for each rotation into a single panoramic image. In one embodiment, the video frames generated for one rotation of the video camera are stitched together to make a single panorama. In one embodiment, the single panorama comprises a 360-degree view. Processing logic stores the single panoramic image in a memory as a single image.

After creating the memory buffers and in parallel with processing each frame, processing logic creates video signals based on video frames in the memory buffer (processing block 220) and transmits the video signal (processing block 221).

After receiving the video signal, processing logic displays images based on the video signal (processing block 222). The entire panorama may be displayed by itself or a portion (e.g., a selected view) may be displayed. In one embodiment, the entire panoramic image and a separate selected view may be displayed on the same display screen or on separate display screens. In one embodiment, displaying the entire panorama comprise displaying a 360-degree view in real time.

Optionally, the process includes processing logic processing an input indicative of a selection of a portion of the single panorama to display as video. In one embodiment, the selection is made to select a set of video frames from a single video stream storing panoramic images for multiple rotations. The set of video frames includes at least one frame captured during each rotation for a field of view corresponding to the selected portion of the single panorama.

In one embodiment, the selection of a particular portion of the panoramic image to view may be specified in one or more of a number of ways. For example, a user may specify the selection by turning a dial to a predetermined location to indicate the direction of view. In such a case, the processing logic receives an indication that the dial has been turned to that predetermined location. In another embodiment, a user may specify the selection by turning a dial a predetermined amount to indicate the direction of view. In such a case, the processing logic receives an indication that the dial has been turned to the predetermined amount to indicate the direction of view. In still another embodiment, a user may specify the selection by selecting a menu option. In such a case, the processing logic receives the selection of the menu option to indicate the direction of view. In still another embodiment, a user may specify the selection by entering an input (e.g., a number). In such a case, the processing logic receives the input specifying the direction of view.

In one embodiment, the field of view could also be selected using a number of different mechanisms. In this case, the field of view refers to the fraction of the panorama to be viewed at once on the display. For instance, if the user wanted to view 60 degrees of the entire panorama, a dial could be turned to indicate the number of degrees of the field of view up to a maximum of 360 degrees. The field of view selection along with the selection of the direction of view gives the user flexibility in how the view appears on the display.

In one embodiment, the angular displacement at which the video camera captures video frames may be changed. In other words, instead of capturing segments 1, 2, and 3 in frame A, the camera might capture the right half of segment 1, all of segments 2 and 3, and the left half of segment 4 in frame A. In other words, a central point of each subsequently captured video frame may be adjusted or offset from its original position. This may be useful when a user desires to position specific objects or individuals appearing in a scene to a different location, such as, for example, having a speaker appear in a central portion of a frame instead of at the side of the frame. Changing the angular displacement may be accomplished by temporarily changing the rate of rotation of the video camera until the desired adjustment or offset is achieved. That is, by changing the rotational speed of the video camera temporarily, the points at which the video camera captures video along the rotational arc may be adjusted. After the adjustment has been made, the rotational speed of the camera is changed back to its original speed. The temporary change in rotational speed may be accomplished by controlling the motor that causes the rotation of the video camera.

An Exemplary Video Capture Mechanism

Figure 3A:
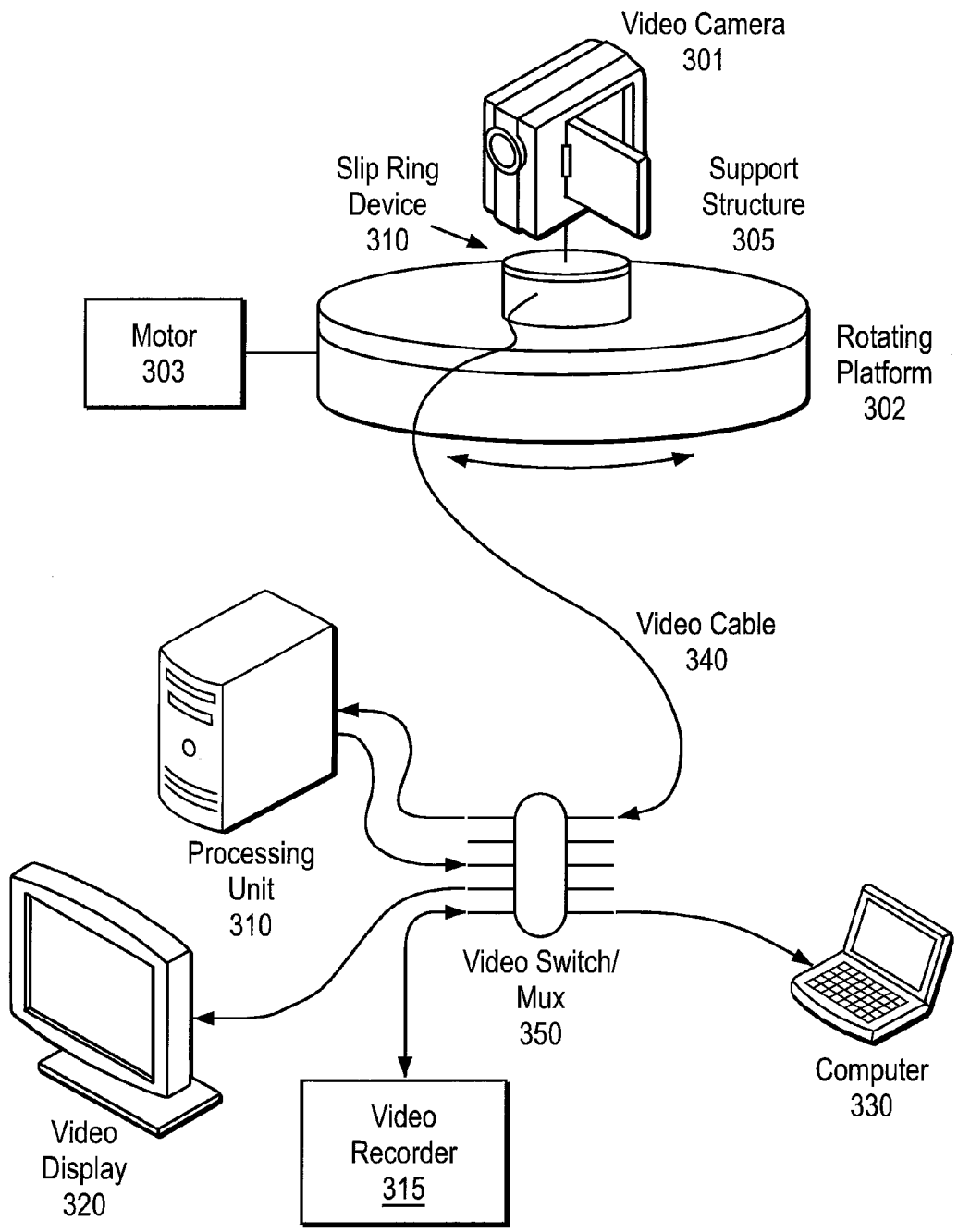
FIG. 3A is a block diagram of one embodiment of a video capture mechanism.

FIG. 3A is a block diagram of one embodiment of a video capture mechanism. Referring to FIG. 3A, a video camera 301 is attached to a rotating platform 302 via a support structure 305. In one embodiment, video camera 301 is detachably coupled to support structure 305. In an alternative embodiment, video camera 301 sits directly onto of and/or is attached directly to rotating platform 302. Rotating platform 302 is mechanically coupled to motor 303, which causes rotating platform 302 to rotate, thereby rotating video camera 301.

Although not shown, in one embodiment, motor 303 is controlled via a motor control. In one embodiment, the motor control controls motor 303 to adjust the view. For example, if at a particular time every second, video camera 301 took a picture directly north, and the operator desired to take a picture slightly to the left of north, that could be achieved by slowing down motor 303 slightly for a specific amount of time, and then returning motor 303 to the original speed. This may be used in order to ensure that someone or something of interest in the panoramic image is in a desired location within the view (e.g., one of the meeting participants in the panoramic image is directly in the middle of a frame instead of slightly to the left or right.

In one embodiment, video camera 301 outputs a video signal that shows spinning video as video camera 301 captures it. In one embodiment, the video signal comprises an industry standard digital video signal (e.g., ITU-R BT 601 for uncompressed, H.323, etc for compressed). In an alternative embodiment, the video signal comprises an industry standard analog video signal (e.g., NTSC, PAL, SECAM). In yet another alternative embodiment, video signal comprises a signal that adheres to an Internet streaming protocol.

The video signal can be transferred from video camera 301 using video cable 340. Video cable 340 may also be used to provide power to video camera 301, although powering video camera 301 through alternative power generation mechanisms (e.g., battery or separate power cable) is readily possible. To prevent such cabling from becoming damaged due to twisting that results from rotation of video camera 301, in one embodiment, slip-ring device 310 is used to transfer signal and power from rotating hardware associated with video camera 301 to stationary hardware (without twisting up cables).

In one embodiment, the video is transferred wirelessly from the image capture device across a wireless network or other wireless communication mechanism. In this embodiment, the image capture device or video camera would also contain the necessary hardware and software to enable the creation and broadcast of video signals or streaming video packets as is well understood in the art. A system like the Xcam2 from X10 of Seattle, Wash. could be used to capture and transmit video wirelessly. In this case, video cable 340 would not be necessary, although a power cable might still be needed and an antenna would be required on both the sending and receiving end of the video signal.

Video cable 340 is coupled to a video switch/multiplexer (mux) 350 that enables multiplexing of the video signal to multiple locations and/or devices. A processing unit 310, video display 320, video recorder 315, and a computer 330 may be coupled to video switch/mux 350.

More specifically, video switch/mux 350 allows the video to flow from video camera 301 to one of a recorder 315, a processing unit 310, a computer 330, or a video display 320. Video switch/mux 350 can switch any input video (coming from either video camera 301 directly or, after processing, from processing unit 310) to output devices (to processing unit 310, to recorder 315, other computers or monitors, such a video display 320).

Processing unit 310 processes the captured video frames in a manner described above to create a single video stream. In one embodiment, the video comes directly from video camera 301 and is sent to processing unit 310 where a single view, low-frame-rate (possibly panoramic) video is constructed. The low-frame-rate panoramic video is then sent from processing unit 310 to video display 320 for display thereby.

Processing unit 310 may comprise a computer system. A memory is coupled to or accessible by processing unit 310 to store the single video stream or frames therefrom. The memory may be used to store captured video frames from video camera 301 prior to their processing by processing unit 310.

In another embodiment, the video from video camera 301 is multiplexed to both recorder 315 (for later analysis) and to a computer, such as, for example, computer 330 or processing unit 310, containing a video frame grabber that processes the incoming video in order to create one or more views of the panoramic video. One view might be that shown in the exemplary user interface discussed below, where a small panoramic view is shown along with a larger directional view in response to a selection made by a user using a selection mechanism or device.

Note that in one embodiment, the video capture mechanism is not required to do any preprocessing of the video signal at the camera in order to display the video captured by video camera 301. For example, computer 330 may include a frame grabber or a digital-to-analog (D/A) converter to capture 1 frame for every revolution of the camera. This frame could be stored in a display memory for subsequent display on the computer screen. Since the captured frames are pointing in the same direction, the image appearing on the computer screen looks like a very low frame-rate video. Another computer may be coupled to video switch/mux 350 and receive the same video signal, but display a frame that is offset from the frame displayed on the screen of computer 330. This causes the video displayed on the screen of the second computer to show a view from a different direction. Alternatively, in one embodiment, demultiplexing video hardware captures 1 of every N frames of video (user selectable) from a video signal and displays that frame over and over until the next frame is captured. If the output of the rotating camera is input to this device and a normal monitor is connected to the output of this device and the user selects "N" to be equal to the number of frames per rotation of the camera, the monitor will show what looks like a stationary camera view, although it has a very low frame rate. Similarly, video recorder 315 may record a video stream from video camera 301 as it rotates. In one embodiment, the video stream is recorded onto a normal VCR tape that can be played back into either a computer or the demux device described above as if it was coming directly from the camera. This use is advantageous in that an individual may view a different scene than the one viewed originally when it was recorded.

There are situations when it may be advantageous for video camera 301 to perform some preprocessing on the video frames prior to their display. For example, if two mirrors are used as video camera 301 is rotating as shown in FIG. 7 to raise the effective frame rate to 3 frames per minute, the processing of the video data will have to occur either on processing unit 310 or on a viewing computer, such as computer 330. Such processing may occur either before it is stored on a recording device, such as video recorder 315, or as it comes from that recording device.

In one embodiment, video camera 301 includes a microphone to capture audio.

Figure 3B:
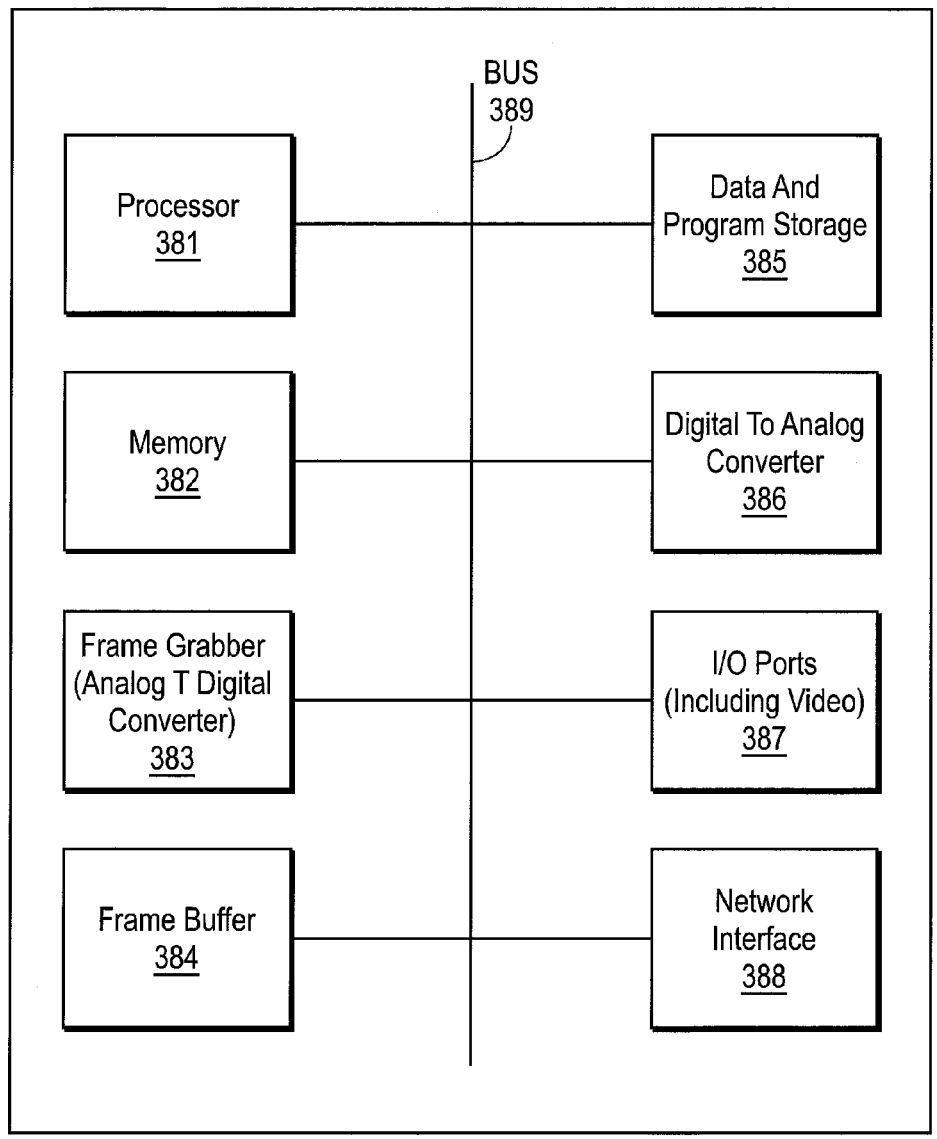
FIG. 3B is a block diagram of one embodiment of a processing unit.

FIG. 3B is a block diagram of one embodiment of processing unit 310. Referring to FIG. 3B, processing unit 380 includes a processor 381, a memory 382, a frame grabber (including an analog-to-digital converter) 383, a frame buffer 384, data and program storage 385, digital-to-analog converter 386, input/output (I/O) ports 387, and network interface 388, coupled to one or more buses 389, to perform functions described herein. The operation of each of these components is well known in the art.

An Exemplary User Interface

In one embodiment, a user interface displays a portion of the panorama in a window. The window may be on the individual's computer screen or other video monitor or display. Alternatively, multiple scenes from the entire field of view of the panorama may be displayed at the same time in different windows.

In one embodiment, the user interface includes a dial by which an individual may select a portion of the field of view to watch. The dial may enable pointing to each of the 12-degree increments around the 360-degree panorama (when the camera is capturing 30 frames per second). Alternatively, the dial may be turned and cause the video on the display to change automatically, so that an individual can turn the dial and watch different portions of the 360 degree panorama appear on the display and stop turning the dial when the desired portion of the 360 degree panorama appears on the display. In another embodiment, the user interface includes a menu (e.g., a pull-down menu) that enables a user to specify the selection of the portion of the panorama to view by selecting a menu option. In still another embodiment, the user interface includes an input window by which an individual specifies their selection by entering an input value (e.g., a number).

In one embodiment, the processing logic to extract the necessary video frames, or portions thereof, from the single video stream and display the resulting video may be part of a computer system. In such a case, the video stream may be sent the computer system via, for example a network connection in response to a request. Thus, software running on the computer system extracts the correct scene from the video stream. In an alternative embodiment, the individual's computer system does not store the entire video stream and generates a request that indicates the scene that is desired. In response to the request, a server performs the extraction, or access video frames corresponding to the scene that were previously extracted, and sends the video frames corresponding to the scene to the individual's computer system.

In one embodiment, along with, or in place of, the display of the selected portion(s) of the panorama, the entire panorama may be displayed. This may facilitate the selection of portions of the field of view by enabling the individual viewer to see the entire panorama.

Figure 4A:
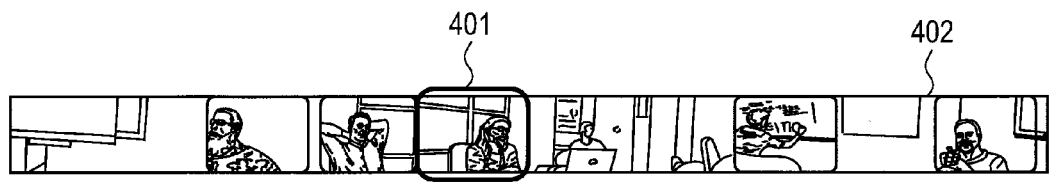
FIGS. 4A and 4B illustrate exemplary user interfaces for use in viewing an entire panorama captured by a continuously rotating camera and/or a portion thereof.
Figure 4B:

FIGS. 4A and 4B illustrate two exemplary user interfaces. Referring to FIG. 4A, multiple views of the panorama are shown at the same time. In one embodiment, the entire panoramic image 402 is shown. Referring to FIG. 4B, a single view chosen from panoramic image 402 is shown. In one embodiment, a slider 401 is dragged along panoramic image 402 to select the single view shown in FIG. 4B. Slider 401 may be dragged in a manner well known in the art using a cursor control device. Alternatively, a rotating knob is turned by the user to select a single view from panoramic image 402. Note that any well-known user input device may be used to select a portion of the entire panoramic image 402.

Figure 4C:
FIGS. 4C and 4D illustrate exemplary user interfaces for use in viewing multiple images captured by a continuously rotating camera and/or a portion thereof.
Figure 4D:

FIGS. 4C and 4D illustrate exemplary user interfaces for use in viewing multiple images captured by a continuously rotating camera and/or a portion thereof. Referring to FIG. 4C, multiple views of the panorama are shown at the same time. In one embodiment, the entire panoramic image 403 is shown. Referring to FIG. 4D, several views chosen from panoramic image 403 are shown. In one embodiment, sliders 404 are dragged along panoramic image 403 to select several views based on the locations of the sliders shown in FIG. 4D.

An Exemplary Computer System

Figure 5:
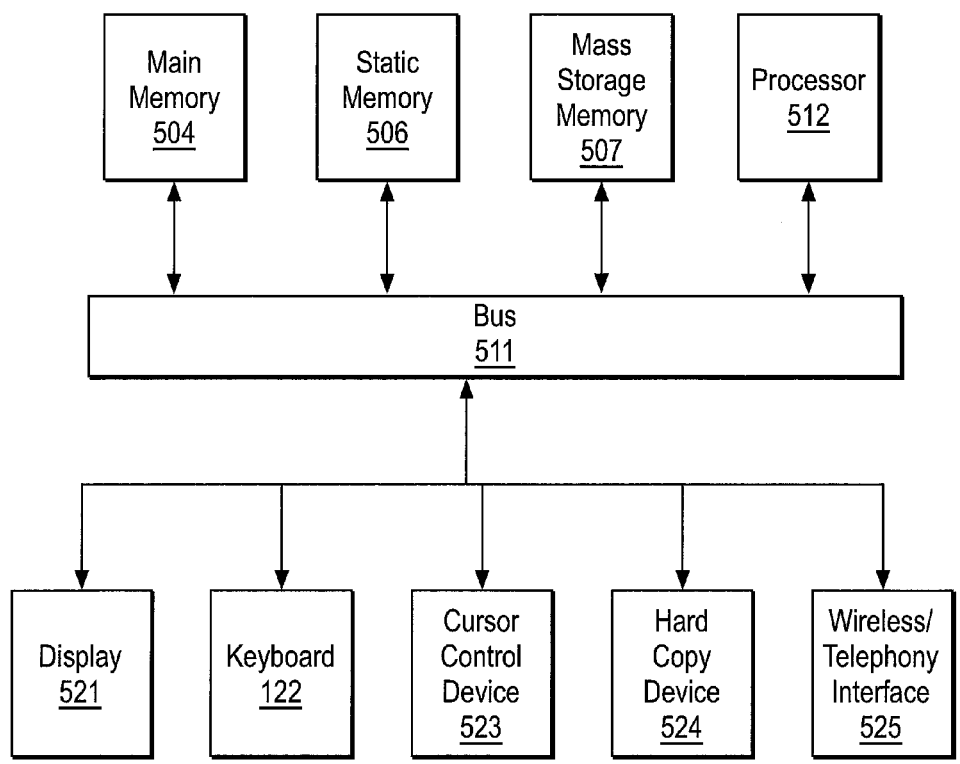
FIG. 5 is a block diagram of one embodiment of a computer system.

FIG. 5 is a block diagram of an exemplary computer system that may perform one or more of the operations described herein. Referring to FIG. 5, computer system 500 may comprise an exemplary client or server computer system. Computer system 500 comprises a communication mechanism or bus 511 for communicating information, and a processor 512 coupled with bus 511 for processing information. Processor 512 includes a microprocessor, but is not limited to a microprocessor, such as, for example, Pentium™, PowerPC™, Alpha™, etc.

System 500 further comprises a random access memory (RAM), or other dynamic storage device 504 (referred to as main memory) coupled to bus 511 for storing information and instructions to be executed by processor 512. Main memory 504 also may be used for storing temporary variables or other intermediate information during execution of instructions by processor 512.

Computer system 500 also comprises a read only memory (ROM) and/or other static storage device 506 coupled to bus 511 for storing static information and instructions for processor 512, and a data storage device 507, such as a magnetic disk or optical disk and its corresponding disk drive. Data storage device 507 is coupled to bus 511 for storing information and instructions.

Computer system 500 may further be coupled to a display device 521, such as a cathode ray tube (CRT) or liquid crystal display (LCD), coupled to bus 511 for displaying information to a computer user. An alphanumeric input device 522, including alphanumeric and other keys, may also be coupled to bus 511 for communicating information and command selections to processor 512. An additional user input device is cursor control 523, such as a mouse, trackball, trackpad, stylus, or cursor direction keys, coupled to bus 511 for communicating direction information and command selections to processor 512, and for controlling cursor movement on display 521.

Another device that may be coupled to bus 511 is hard copy device 524, which may be used for printing instructions, data, or other information on a medium such as paper, film, or similar types of media. Furthermore, a sound recording and playback device, such as a speaker and/or microphone may optionally be coupled to bus 511 for audio interfacing with computer system 500. Another device that may be coupled to bus 511 is a wired/wireless communication capability 525 to communication to a phone or handheld palm device.

Note that any or all of the components of system 500 and associated hardware may be used in the present invention. However, it can be appreciated that other configurations of the computer system may include some or all of the devices.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims that in them recite only those features regarded as essential to the invention.

We claim:

1. A method comprising:
capturing, at a same time, three segments that include first and second segments that are behind a third segment in a field of view of a camera by an image capture sensor of the camera, wherein the first, second, and third segments are non-adjacent segments captured from three different directions and the camera is continuously rotated;
converting data captured by the image capture sensor of the camera into a data stream for each rotation of the camera to create one continuous panoramic data stream, each of the three segments capturing a portion of the field of view per rotation of the camera, wherein a plurality of video frames are captured for each rotation of the camera with two mirrors that are positioned in front of a camera lens to cause non-neighboring image segments from three different directions that are evenly spaced among a plurality of segments within the video stream to be captured in each frame, wherein the first and second segments are captured behind a field of view of the camera and include reversed image data when captured via the two mirrors, and wherein for each frame the three segments are separated into individual image segments, the reversed image data for the first and second segments are reversed, and each of the separated segments is arranged into a correct position with respect to the field of view when converted into the data stream to provide the one continuous panoramic data stream;
converting the data stream from the image capture sensor into a continuously updated view of the portion of the field of view of the camera as the camera is continuously rotated; and
creating a panorama video from the converted data stream with a frame rate of three times a rotation speed of the camera.

2. The method defined in claim 1 wherein the data stream comprises a video signal.

3. The method defined in claim 2 wherein the video signal comprises an industry standard digital video signal.

4. The method defined in claim 3 wherein the industry standard digital video signal comprises one selected from a group consisting of an ITU-R BT 601 digital video signal and an H.323 digital video signal.

5. The method defined in claim 2 wherein the video signal comprises an industry standard analog video signal.

6. The method defined in claim 5 wherein the industry standard analog video signal comprises one selected from a group consisting of an NTSC analog video signal, PAL analog video signal, and a SECAM analog video signal.

7. The method defined in claim 2 wherein the video signal conforms to the Internet streaming protocol.

8. The method defined in claim 2 further comprising transmitting the video signal to a remote receiver.

9. The method defined in claim 2 further comprising transmitting and receiving power and signals from stationary wires.

10. The method defined in claim 1 wherein the portion comprises all of the field of view.

11. The method defined in claim 10 wherein all of the field of view comprises an entire panorama.

12. The method defined in claim 1 further comprising temporarily changing rotational speed of the camera in order to adjust a direction of view of the camera with respect to each captured frame.

13. The method defined in claim 1 further comprising:
capturing a plurality of video frames for each rotation while repeatedly rotating the camera;
combining the plurality of video frames for each rotation into a single panorama image; and
combining panorama images for a plurality of rotations into a single video stream.

14. The method defined in claim 13 further comprising processing an input indicative of a selection of a portion of the single panorama to display using a set of video frames from the single video stream, wherein the set of video frames includes at least one frame captured during each rotation for a field of view corresponding to the selected portion of the single panorama.

15. The method defined in claim 13 wherein the single panorama comprises a 360-degree view.

16. The method defined in claim 14 further comprising displaying the 360-degree view in real time.

17. The method defined in claim 13 further comprising displaying the single panorama in real-time.

18. The method defined in claim 14 wherein processing the input indicative of the selection of the portion of the single panorama to display comprises:
receiving a selection of the direction of view;
extracting one or more frames for each rotation from the single video stream; and generating video data for display.

19. The method defined in claim 18 wherein receiving the selection of the direction of view comprises at least one selected from the group consisting of:
receiving an indication that a dial has been turned to a predetermined location to indicate the direction of view, receiving an indication that a dial has been turned to a predetermined amount to indicate the direction of view, receiving a selection of a menu option to indicate the direction of view, receiving an input specifying the direction of view.

20. The method defined in claim 14 further comprising adjusting the field of view to be displayed.

21. The method defined in claim 13 wherein capturing a plurality of video frames for each rotation comprises capturing 30 video frames per second.

22. The method defined in claim 13 wherein video frame data corresponding to each of the video frames is spaced apart from each other a predetermined number of frames throughout the single video stream.

23. The method defined in claim 13 further comprising displaying the selected portion of the single panorama and displaying the single panorama in a separate area on a display displaying the selected portion of the single panorama.

24. The method defined in claim 13 wherein at least one mirror is positioned in front of the camera lens to cause images from a plurality of different directions to be captured in each frame.

25. An apparatus comprising:
a camera, the camera comprising:
an image capture sensor, the image capture sensor to capture, at a same time, three segments that include first and second segments that are behind a third segment in a field of view of the camera, wherein the first, second, and third segments are non-adjacent segments captured from three different directions that are captured as the camera is continuously rotated;
a circuit to convert data captured by the image capture sensor into a data stream for each rotation of the camera to create one continuous panoramic data stream, each of the three segments capturing a portion of the field of view per rotation of the camera, wherein a plurality of video frames are captured for each rotation of the camera with two mirrors that are positioned in front of a camera lens to cause non-neighboring image segments from three different directions that are evenly spaced among a plurality of segments within the video stream to be captured in each frame, wherein the first and second segments are captured behind a field of view of the camera and include reversed image data for the when captured via the two mirrors, and wherein for each frame the three segments are separated into individual image segments, the reversed image data for the first and second segments are reversed, and each of the separated segments is arranged into a correct position with respect to the field of view when converted into the data stream to provide the one continuous panoramic data stream; and
a processing unit coupled to the camera to convert the data stream from the image capture sensor into a continuously updated view of the portion of the field of view of the repeatedly rotating camera and combine a plurality of video frames from the data stream into a single panorama image and to combine panorama images into a single video stream as the camera is continuously rotated, wherein the single video stream has a frame rate of three times a rotation speed of the camera.

26. The apparatus defined in claim 25 wherein the data stream comprises a video signal.

27. The apparatus defined in claim 26 wherein the video signal comprises an industry standard digital video signal.

28. The apparatus defined in claim 27 wherein the industry standard digital video signal comprises one selected from a group consisting of an ITU-R BT 601 digital video signal and an H.323 digital video signal.

29. The apparatus defined in claim 26 wherein the video signal comprises an industry standard analog video signal.

30. The apparatus defined in claim 29 wherein the industry standard analog video signal comprises one selected from a group consisting of an NTSC analog video signal, PAL analog video signal, and a SECAM analog video signal.

31. The apparatus defined in claim 26 wherein the video signal conforms to the Internet streaming protocol.

32. The apparatus defined in claim 25 further comprising a cable to transmit the video signal to a remote receiver.

33. The apparatus defined in claim 25 further comprising a wireless communication mechanism to transmit the video signal to a remote receiver.

34. The apparatus defined in claim 25 further comprising a cable coupled to the camera to transmit and receive power and signals.

35. The apparatus defined in claim 25 wherein the portion comprises all of the field of view.

36. The apparatus defined in claim 35 wherein all of the field of view comprises an entire panorama.

37. The apparatus defined in claim 25 further comprising:
a motor coupled to rotate the camera; and
a motor control coupled to the motor to temporarily change rotational speed of the camera in order to adjust the direction of the camera with respect to each captured frame.

38. The apparatus defined in claim 25 wherein the processing unit processes an input indicative of a selection of a portion of the single panorama for display as video using a set of video frames from the single video stream, wherein the set of video frames includes at least one frame captured during each rotation for a field of view corresponding to the selected portion of the single panorama.

39. The apparatus defined in claim 38 wherein the single panorama comprises a 360-degree view.

40. The apparatus defined in claim 39 further comprising a display to display the 360-degree view in real time.

41. The apparatus defined in claim 38 further comprising a display to display the panorama in real-time.

42. The apparatus defined in claim 38 wherein the processing unit is operable to display the selected portion of the single panorama by:
receiving a selection of the direction of view;
extracting one or more frames for each rotation from the single video stream; and
generating video data for display.

43. The apparatus defined in claim 42 wherein the processing unit is operable to receive the selection of the direction of view by at least one of the following:
receiving an indication that a dial has been turned to a predetermined location to indicate the direction of view, receiving an indication that a dial has been turned to a predetermined amount to indicate the direction of view, receiving a selection of a menu option to indicate the direction of view, receiving an input specifying the direction of view.

44. The apparatus defined in claim 38 wherein the processing unit is operable to adjust the field of view to be displayed.

45. The apparatus defined in claim 25 wherein the camera captures 30 video frames per second for each rotation.

46. The apparatus defined in claim 38 wherein the video frame data corresponding to each of the video frames is spaced apart from each other a predetermined number of frames throughout the single video stream.

47. The apparatus defined in claim 38 further comprising a display to display the selected portion of the single panorama and display the single panorama in a separate area on the display.

48. The apparatus defined in claim 38 further comprising at least one mirror positioned in front of the camera lens to cause images from a plurality of different directions to be captured in each frame.

49. An article of manufacture having one or more recordable media storing instructions thereon which, when executed by a system, cause the system to perform a method comprising:
capturing, at a same time, three segments that include first and second segments that are behind a third segment in a field of view of a camera by an image capture sensor of the camera, wherein the first, second, and third segments are non-adjacent segments captured from three different directions and the camera is continuously rotated;
converting data captured by the image capture sensor of the camera into a data stream for each rotation of the camera to create one continuous panoramic data stream, each of the three segments capturing a portion of the field of view per rotation of the camera, wherein a plurality of video frames are captured for each rotation of the camera with two mirrors that are positioned in front of a camera lens to cause non-neighboring image segments from three different directions that are evenly spaced among a plurality of segments within the video stream to be captured in each frame, wherein the first and second segments are captured behind a field of view of the camera and include reversed image data when captured via the two mirrors, and wherein for each frame the three segments are separated into individual image segments, the reversed image data for the first and second segments are reversed, and each of the separated segments is arranged into a correct position with respect to the field of view when converted into the data stream to provide the one continuous panoramic data stream;
converting the data stream from the image capture sensor into a continuously updated view of the portion of the field of view of the camera as the camera is continuously rotated; and
creating a panorama video from the converted data stream with a frame rate of three times a rotation speed of the camera.

50. The article of manufacture defined in claim 49 wherein the data stream comprises a video signal.

51. The article of manufacture defined in claim 50 wherein the video signal comprises an industry standard digital video signal.

52. The article of manufacture defined in claim 51 wherein the industry standard digital video signal comprises one selected from a group consisting of an 1TU-R BT 601 digital video signal and an H.323 digital video signal.

53. The article of manufacture defined in claim 50 wherein the video signal comprises an industry standard analog video signal.

54. The article of manufacture defined in claim 53 wherein the industry standard analog video signal comprises one selected from a group consisting of an NTSC analog video signal, PAL analog video signal, and a SECAM analog video signal.

55. The article of manufacture defined in claim 50 wherein the video signal conforms to the Internet streaming protocol.

56. The article of manufacture defined in claim 50 wherein the method further comprises transmitting the video signal to a remote receiver.

57. The article of manufacture defined in claim 50 wherein the method further comprises transmitting and receiving power and signals from stationary wires.

58. The article of manufacture defined in claim 49 wherein the portion comprises all of the field of view.

59. The article of manufacture defined in claim 58 wherein all of the field of view comprises an entire panorama.

60. The article of manufacture defined in claim 49 wherein the method further comprises temporarily changing rotational speed of the camera in order to adjust a direction of view of the camera with respect to each captured frame.

61. The article of manufacture defined in claim 49 wherein at least one mirror is positioned in front of the camera lens to cause images from a plurality of different directions to be captured in each frame.

62. A method comprising:
capturing 30 video frames per second using a camera;
capturing, at a same time, three segments for each captured video frame that include first and second segments that are behind a third segment in a field of view of the camera, wherein the first, second, and third segments are non-adjacent segments captured from three different directions;
stitching captured video frames together to make a single panorama, wherein each of the three segments captures a portion of the field of view per rotation of the camera, wherein a plurality of video frames are captured for each rotation of the camera with two mirrors that are positioned in front of a camera lens to cause non-neighboring images from three different directions that are evenly spaced among a plurality of images to be captured in each frame, wherein the first and second segments are captured behind a field of view of the camera and include reversed image data when captured via the two mirrors, and wherein for each frame the three segments are separated into individual image segments, the reversed image data for the first and second segments are reversed, and each of the separated segments is arranged into a correct position with respect to the field of view when stitched into the single panorama;

storing frame data corresponding to the single panorama in a single video stream for a continuous panoramic data stream; and repeatedly updating the single panorama, including adding newly captured video frames onto the single video stream with a frame rate of three times a rotation speed of the camera to continuously update the continuous panoramic data stream.

63. The method defined in claim 62 further comprising spinning the camera more than one time.

64. The method defined in claim 62 wherein the single panorama comprises a 360-degree view.

65. The method defined in claim 62 further comprising receiving a selection of a portion of the video stream to view.

66. The method defined in claim 62 further comprising:
receiving a selection of a view in the panorama;
accessing video frames in the single video stream corresponding to the view; and
playing the video frames.

67. The method defined in claim 66 wherein the video frame data corresponding to the each of the video frames is spaced apart from each other a predetermined number of frames throughout the single video stream.

68. The method defined in claim 62 wherein repeatedly updating the single panorama comprises repeatedly capturing 30 additional video frames, stitching the additionally captured video frames together, and storing frame data corresponding to the additionally captured video frames into the single video stream.

69. An article of manufacture having one or more recordable media storing instructions thereon which, when executed by a system, cause the system to perform a method comprising:

capturing 30 video frames using a camera;
capturing, at a same time, three segments for each captured video frame that include first and second segments that are behind a third segment in a field of view of the camera, wherein the first, second, and third segments are non-adjacent segments captured from three different directions;
stitching captured video frames together to make a single panorama, wherein each of the three segments captures a portion of the field of view per rotation of the camera, wherein a plurality of video frames are captured for each rotation of the camera with two minors that are positioned in front of a camera lens to cause non-neighboring images from three different that are evenly spaced among a plurality of images to be captured in each frame, wherein the first and second segments are captured behind a field of view of the camera and include reversed image data when captured via the two mirrors, and wherein for each frame the three segments are separated into individual image segments, the reversed image data for the first and second segments are reversed, and each of the separated segments is arranged into a correct position with respect to the field of view when stitched into the single panorama;

storing frame data corresponding to the single panorama in a single video stream for a continuous panoramic data stream; and repeatedly updating the single panorama n times per second, including adding newly captured video frames onto the single video stream with a frame rate of three times a rotation speed of the camera to continuously update the continuous panoramic data stream.

70. An apparatus comprising:
means for capturing 30 video frames using a camera;
means for capturing, at a same time, three segments for each captured video frame that include first and second segments that are behind a third segment in a field of view of the camera, wherein the first, second, and third segments are non-adjacent segments captured from three different directions;
means for stitching captured video frames together to make a single panorama, wherein each of the three segments captures a portion of the field of view per rotation of the camera, wherein a plurality of video frames are captured for each rotation of the camera with two mirrors that are positioned in front of a camera lens to cause non-neighboring images from three different directions that are evenly spaced among a plurality of images to be captured in each frame, wherein the first and second segments are captured behind a field of view of the camera and include reversed image data when captured via the two mirrors, and wherein for each frame the three segments are separated into individual image segments, the reversed image data for the first and second segments are reversed, and each of the separated segments is arranged into a correct position with respect to the field of view when stitched into the single panorama;
means for storing frame data corresponding to the single panorama in a single video stream for a continuous panoramic data stream; and
means for repeatedly updating the single panorama n times per second, including adding newly captured video frames onto the single video stream with a frame rate of three times a rotation speed of the camera to continuously update the continuous panoramic data stream.

* * * * *